(No Model.)

T. W. BROOMALL & E. A. MERCER.
SPRING WASHER.

No. 259,665. Patented June 20, 1882.

WITNESSES
Franck L. Ouraud,
L. L. Miller.

INVENTORS
Thomas W. Broomall,
Evan A. Mercer,
per Chas. H. Fowler
Attorney

N. PETERS, Photo-Lithographer, Washington, D. C.

UNITED STATES PATENT OFFICE.

THOMAS W. BROOMALL, OF WEST CHESTER, AND EVAN A. MERCER, OF CHRISTIANA, PENNSYLVANIA.

SPRING-WASHER.

SPECIFICATION forming part of Letters Patent No. 259,665, dated June 20, 1882.

Application filed April 27, 1882. (No model.)

*To all whom it may concern:*

Be it known that we, THOMAS W. BROOMALL and EVAN A. MERCER, citizens of the United States, the former residing at West Chester, in the county of Chester, and the latter at Christiana, Lancaster county, and State of Pennsylvania, have invented certain new and useful Improvements in Spring-Washers; and we do hereby declare that the following is a full, clear, and exact description of the same, reference being had to the annexed drawings, making a part of this specification, and to the letters and figures of reference marked thereon.

Figure 1:
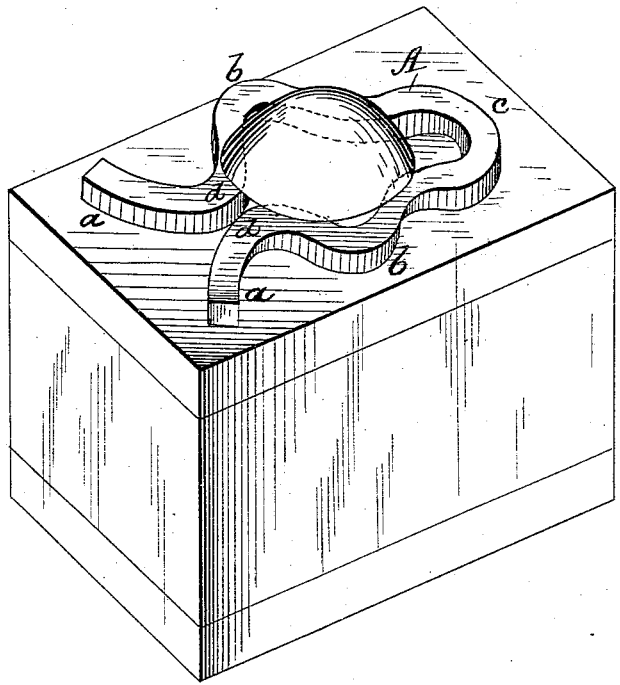
Figure 2:
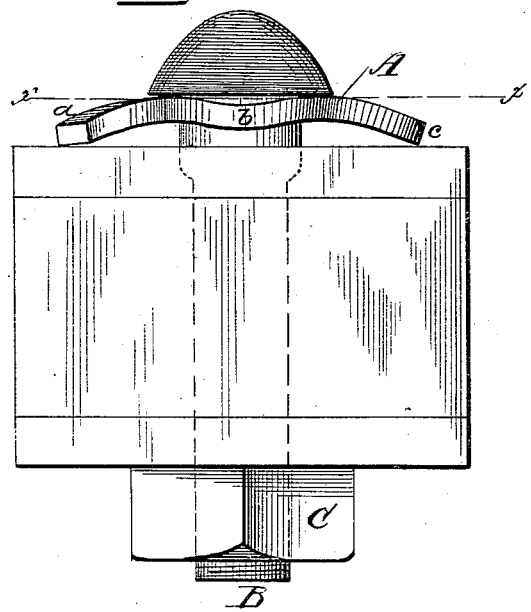
Figure 4:
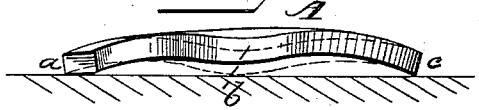
Figure 3:
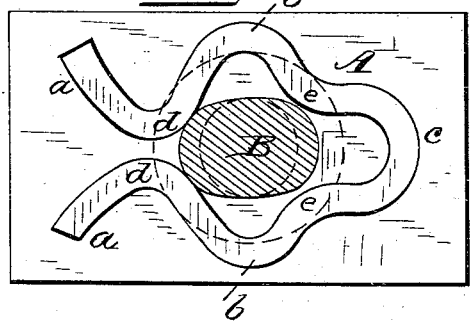

Figure 1 of the drawings is a perspective view, showing the application of our invention; Fig. 2, a side elevation thereof; Fig. 3, a top plan view with the bolt in section, and Fig. 4 a detail view of the spring-washer.

The present invention has reference to that class of spring-washers employed for insuring the tension of bolts used in securing articles or structures, and has for its object to compensate for the slack resulting from wear of the nut or bolt-head and contiguous surfaces or by the unscrewing or displacing of the nut.

The invention consists in the peculiar construction and form of the spring-washer, substantially as shown in the drawings and hereinafter described and claimed.

In the accompanying drawings, A represents the washer, and B the headed bolt, to which is connected at its screw-threaded end a suitable nut, C. The washer A is composed of a single piece of spring-steel bent horizontally in a serpentine shape, as shown, so as to form outwardly-projecting bearing-points *a a, b b,* and *c,* and inwardly-projecting points *d d, e e,* between which is located the bolt B, with the head or nut, as the case may be, resting thereon, said bolt being passed through the article or structure to be secured. The ends or points *a* from the points *d* are curved in an outward direction and downward to a greater degree than the rear portion or point, *c,* and sides or points *b,* thereby causing the strain to be thrown from points *a* to *c* in the form of a twist—that is to say, the strain is distributed equally throughout the entire washer until the points *b* come in contact with the surface of the article or structure upon which the washer is used. By this peculiar form of the spring-washer A it will be seen that there are five bearing-points, *a a, b b,* and *c,* when the washer is fully compressed. After the points *b b* begin to bear additional strength is obtained, because the shape across the washer from *b* to *b* is concave upon its under side. The inwardly-projecting points *d d* and *e e* bear against the usual shoulders upon the bolt directly under the head, and so prevent the washer from turning or getting crosswise of the article or structure against which it bears.

By constructing a spring-washer in accordance with our invention, we provide a compensating-spring that readily takes up the slack occasioned from the wear of the nut or bolt-head and the contiguous surfaces, or by the unscrewing or displacement of the nut, and also the expansion and contraction of the article or structure upon which it is placed. The strain being thrown from the front to rear of the washer, it is equally distributed throughout the same over the entire surface, thus giving a greater efficiency than where the strain comes entirely upon a portion thereof. The bearing-points of the washer upon its sides being at a greater elevation than those of the front and rear, a greater strength is given to the washer when the points begin to bear, because of the concavity they describe upon their under side, the concavity from the front to rear having been nearly pressed out by the time these side points begin to bear. Thus, by having the spring-washer of the form shown and hereinbefore described we are enabled to secure a spring bearing both in a horizontal and transverse direction, giving increased strength and elasticity to the washer.

Having now fully described our invention, what we claim as new, and desire to secure by Letters Patent, is—

The serpentine spring-washer A, of the form substantially as shown, having outwardly-projecting bearing-points *a a, b b,* and *c* and inwardly-projecting points *d d, e e,* said washer being concave laterally and horizontally throughout its entire length, substantially as and for the purpose set forth.

In testimony that we claim the above we have hereunto subscribed our names in the presence of two witnesses.

THOMAS W. BROOMALL.
EVAN A. MERCER.

Witnesses:
TAYLOR B. MERCER,
A. RUPERT.